United States Patent [19]

Rottenkolber et al.

[11] Patent Number: 4,461,189
[45] Date of Patent: Jul. 24, 1984

[54] GAS TWIST GRIP FOR HANDLEBARS OF MOTOR-DRIVEN TWO-WHEELED VEHICLES

[75] Inventors: Ludwig Rottenkolber; Karl Autenrieth, both of Urach, Fed. Rep. of Germany

[73] Assignee: Gustav Magenwirth GmbH & Co., Urach, Fed. Rep. of Germany

[21] Appl. No.: 247,282

[22] Filed: Mar. 25, 1981

[30] Foreign Application Priority Data

Apr. 3, 1980 [DE] Fed. Rep. of Germany ....... 3013008

[51] Int. Cl.³ ............................................ G05G 11/00
[52] U.S. Cl. ........................................ 74/489; 74/506
[58] Field of Search ........................... 74/488, 489, 506

[56] References Cited

U.S. PATENT DOCUMENTS

| 1,346,361 | 7/1920 | Williams | 74/562 |
| 3,875,815 | 4/1975 | Erith et al. | 74/506 X |
| 4,191,065 | 3/1980 | Golobay et al. | 74/506 X |
| 4,352,303 | 10/1982 | Christner | 74/489 |

FOREIGN PATENT DOCUMENTS 693658 7/1953 United Kingdom ............... 74/489

Primary Examiner—Allan D. Herrmann
Assistant Examiner—Frank McKenzie
Attorney, Agent, or Firm—Shenier & O'Connor

[57] ABSTRACT

An improved twist gas strip for the handlebar of a motorcycle or the like in which a bowden cable return roll housing has a continuous slit for suspending the bowden cable, which slit is closed above the return roll by a detachable lid.

7 Claims, 6 Drawing Figures

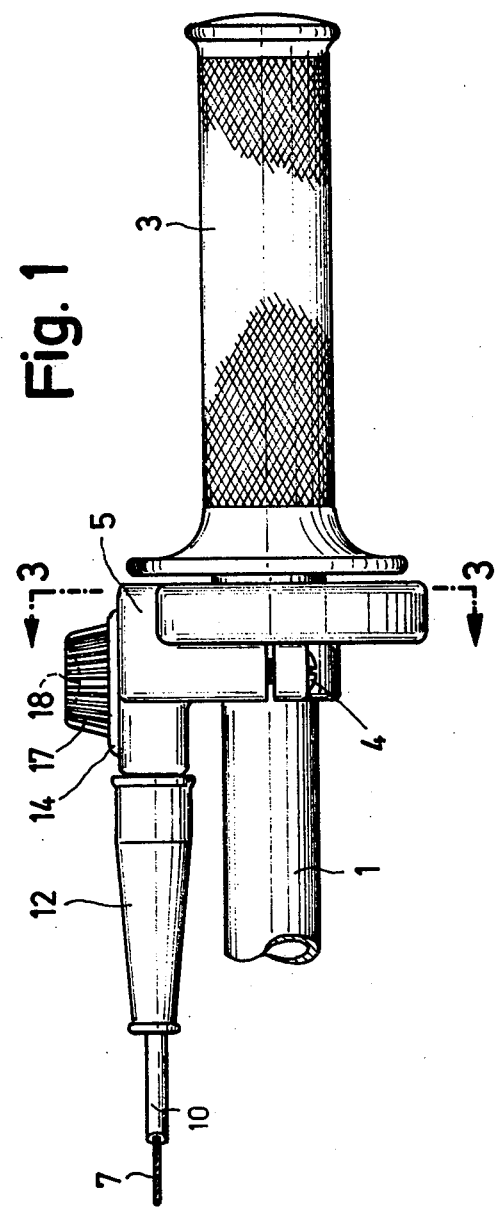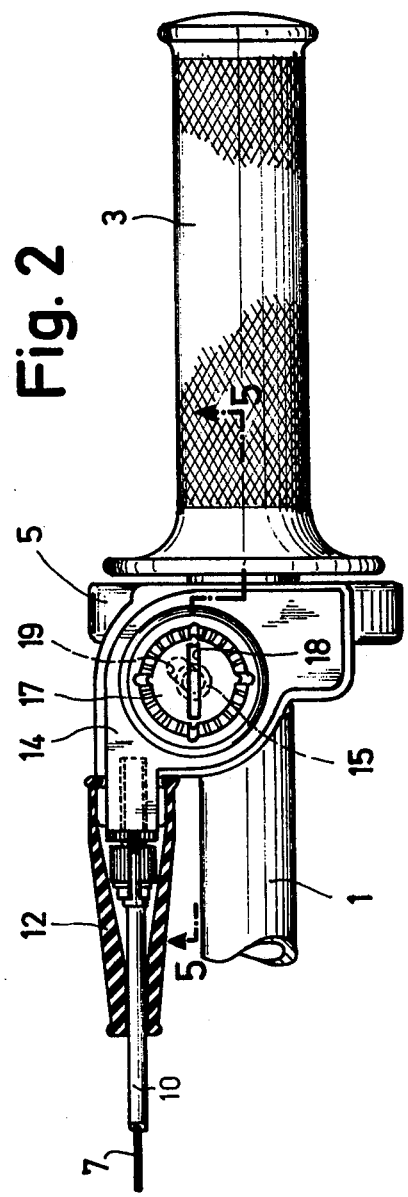

GAS TWIST GRIP FOR HANDLEBARS OF MOTOR-DRIVEN TWO-WHEELED VEHICLES

FIELD OF THE INVENTION

The present invention relates to gas twist grips for handlebars of motor-driven two-wheeled vehicles with a housing fastened on said handlebar, and with a tube mounted rotatable thereon and held axially immovable by said housing, said tube being rigidly joined with a drum accommodating a bowden cable, and further with a rotatable roll for said bowden cable.

BACKGROUND OF THE INVENTION

In presently known gas twist grips of this type the bowden cable must be passed through a hole in the housing and then hung into the drum holding this cable. These operations are cumbersome and achieved only with great difficulty. It thus constitutes a very time-consuming process which can lead to critical losses of time when a broken bowden cable has to be quickly exchanged, as for example in motorcycle races.

SUMMARY OF THE INVENTION

It is therefore the object of the present invention to improve gas twist grips of the type mentioned above to such an extent as to allow easy and quick suspension of the bowden cable into the drum provided for the said bowden cable.

According to the invention, this object is achieved in that the housing has a continuous slit for suspending the bowden cable and furthermore is closed above the return roll by way of a detachable lid.

BRIEF DESCRIPTION OF THE DRAWINGS

The following description of preferred embodiments of the invention given on hand of the attached drawings will explain more fully the essence of the present invention. In the said drawings, FIG. 1 shows a side view of a gas twist grip;

FIG. 2 shows a partially exposed top view of the gas twist grip of FIG. 1;

DESCRIPTION OF THE PREFERRED EMBODIMENT

Figure 3:
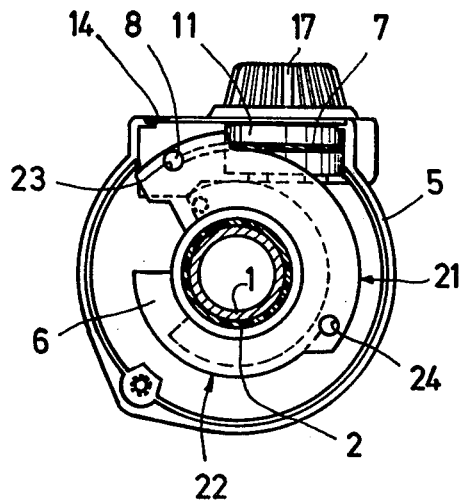
FIG. 3 shows a sectional view along line 3—3 of FIG. 1.

FIG. 1 shows the right side of a handlebar 1 of a motor-driven two-wheeled vehicle made in the conventional manner from metal tubing. A tube 2 made of plastic is mounted rotatable on handlebar 1, on which tube a sleeve 3 made of rubber or the like is placed so as to be rigidly fixed thereon. This sleeve 3 is gripped with the right hand of the driver. By twisting sleeve 3, tube 2 on handlebar 1 will likewise be twisted.

A housing 5 is furthermore fastened by means of screws 4 on handlebar 1, said housing enclosing the part of tube 2 which protrudes from sleeve 3. The part of tube 2 surrounded by housing 5 is designed as cable drum 6 on which one end of a bowden cable 7 is fastened in the customary manner by means of a nipple 8. In said housing 5, furthermore, a return roll 11 for the bowden cable is rotatably mounted by means of a screw 9. This return roll allows the bowden cable to be led out of housing 5 parallelly to the axis of handlebar 1. The point where bowden cable 7 emerges from housing 5 is conventionally covered over by means of a rubber socket 12. With a turning of tube 2, cable 7 will wind onto or off drum 6 so as to control the fuel amount to the motor of the two-wheeled vehicle in the manner known per se.

Figure 5:
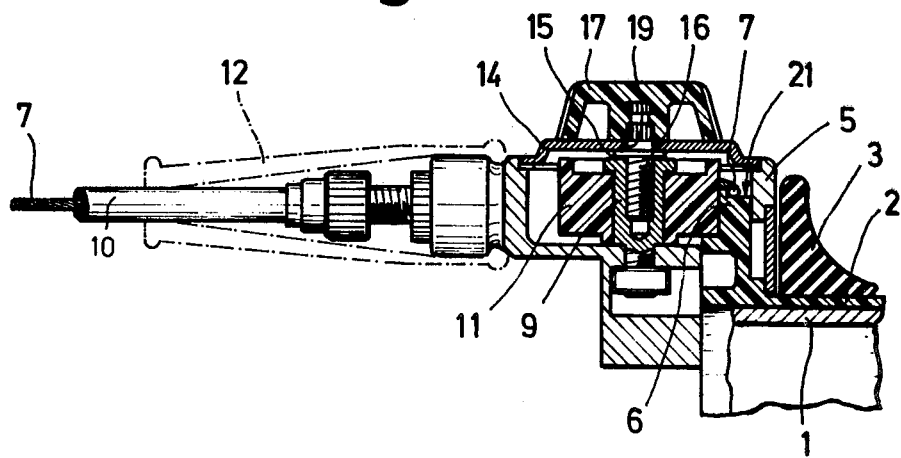
FIG. 5 shows a sectional view along line 5—5 of FIG. 2.
Figure 6:
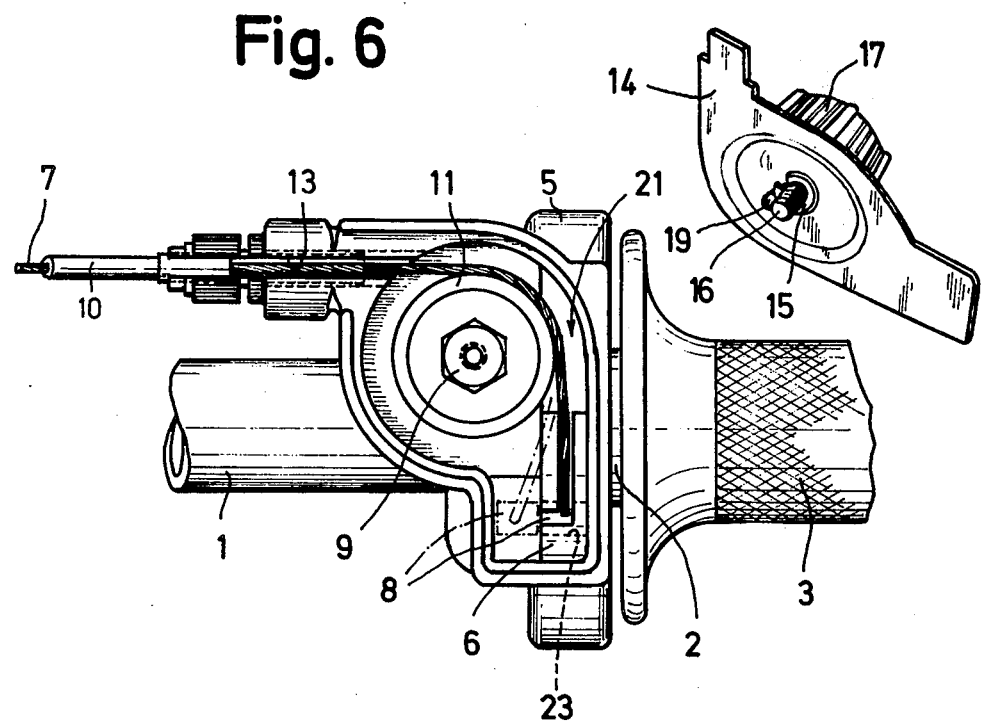
FIG. 6 shows a perspective partial view of a gas twist grip with the lid of the housing removed.

To be able to insert the bowden cable into the housing and join it with cable drum 6 smoothly, the following measures are used according to the invention: housing 5 has at the point where sheathing 10 of bowden cable 7 is conventionally joined with the housing by means of screws and nuts a slit 13 open toward the top into which bowden cable 7 can be easily inserted from above (see FIG. 6). The said bowden cable 7 is then placed about return roll 11 and can then be hung with the greatest of ease from above, by means of nipple 8, into a corresponding groove provided on drum 6. The open upper side of housing 5 (see FIG. 6) can be closed off by means of a lid 14 which corresponds to the shape of said housing. Lid 14 is joined by means of a safety ring 15 rotatable, but axially immovable, with the threaded spindle 16 (screw spindle) of a knob 17 which, when assembled, lies above lid 14. Knob 17 is provided with lateral grooving in the conventional manner so that it can be easily turned by hand. The said knob has, furthermore, on its upper side (see FIG. 2) a slit 18 into which a coin or the like can be inserted so as to loosen the previously tightened knob. Since lid 14 is joined rotatable but axially immovable with screw spindle 16 of knob 17 said lid will rise from the upper side of housing 5 when knob 17 is loosened so that the bowden cable 7, as a result of the space opened thereby, can be easily inserted, placed about the return roll 11, and joined with cable drum 6. Screw spindle 16 engages thereat in a tapped hole inside screw 9 holding the return roll 11 (see FIG. 5). If necessary, the lid 14 thus slightly raised after loosening of knob 17 can be twisted also relatively to the housing 5, thus resulting in a partial exposure of its upper side and further facilitating the insertion of the bowden cable 7.

As shown in FIGS. 2 and 6, lid 14 can have a slit 19 at the point where it is pierced by screw spindle 16 and joined by safety ring 15 with said spindle, which slit 19 will furthermore enable a lateral displacement of the raised lid relatively to the housing, thus resulting in an additional space between housing 5 and lid 14 which will likewise facilitate the insertion of the bowden cable.

In a further embodiment of the invention, the screw spindle 16 of knob 17 can serve simultaneously as the spindle for return roll 11. It is preferable, however, to use the screw 9 designed as hollow screw so that the return roll 11 is held inside the housing independently of the lid.

Figure 4:
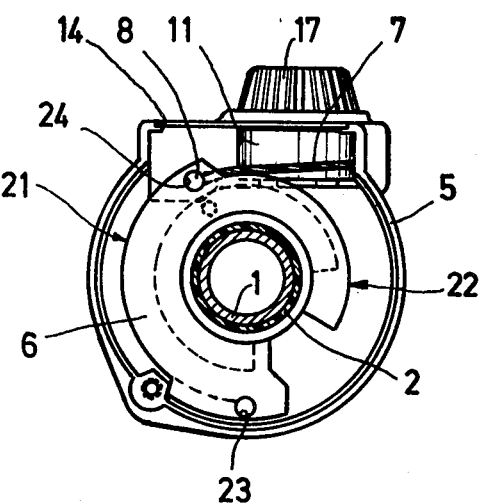
FIG. 4 shows a view similar to FIG. 3, but with a different arrangement of a cable drum.

As evident from FIGS. 3 and 4, the cable drum 6 has two areas 21, 22 of different diameters with which slots 23 and 24 respectively for the hanging of bowden cable 7 are associated. By turning 180°, the cable drum 6 which in this case is designed as a component detachable from tube 2, but positively lockable with the same can be arranged as shown in FIG. 3 or as shown in FIG. 4. If arranged as in FIG. 3, the bowden cable 7 winds itself onto the part 21 of drum 6 that has a larger diameter, while when arranged as in FIG. 4, the said bowden cable 7 winds itself on the part 22 of drum 6 that has a smaller diameter. In this manner, a specific "transmission" between tube and displacement of bowden cable 7 can be set, all according to what particular sensitivity of adjustment is desired.

Although lid 14 can be completely detached from housing 5 by an appropriate loosening of knob 17, this is normally not required for the insertion of a bowden cable 7. A few turnings of knob 7, easily executed by hand, will suffice to raise the lid 14 from the housing far enough to allow the cable 7 to be inserted first into slit 13 and then into housing 5. If warranted, lid 14, after having been slightly raised from the housing, can additionally be shifted sideways by way of the aforementioned slit 19. In addition to the above, the main advantage consists in the fact that, due to its relatively large diameter, the knob can easily be actuated by hand and thus requires no special tool for loosening of lid 14 from housing 5.

Having thus described our invention, what we claim is:

1. A twist gas grip for the handlebar of a motor-driven two-wheeled vehicle including in combination a tube rotatable on said handlebar, a housing secured to said handlebar for restraining said tube against movement in the direction of the axis of said handlebar, a bowden cable, a cable-receiving drum carried by said tube for movement therewith, a cable return roll separate from said drum, means mounting said return roll for rotary movement to guide said cable for movement out of said housing in a direction parallel to an axis of the handlebar, said housing being formed with a continuous slit open at the top of said housing to permit insertion of said cable from above, placing it on said roll and hanging it on said drum, and a detachable lid for closing said housing above said return roll.

2. Gas twist grip as in claim 1 characterized in that the lid (14) is detachable by means of a manually actuated knob (17).

3. Gas twist grip as in claim 2 characterized in that the lid (14) can be raised by means of said knob (17).

4. Gas twist grip as in claim 3, characterized in that the lid (14) is held rotatable, but axially immovable on a screw spindle (16) of knob (17) by means of a safety ring (15).

5. Gas twist grip as in claim 4 characterized in that the lid (14) has a slit (19) in the area of spindle (16).

6. Gas twist grip as in claim 1 characterized in that the return roll (11) is held inside housing (5) independently of lid (14).

7. Gas twist grip as in claim 1 characterized in that the return roll (11) is held by means of a hollow screw (9) the internal bore of which takes up the screw spindle (16) of the knob (17).

* * * * *